UNITED STATES PATENT OFFICE.

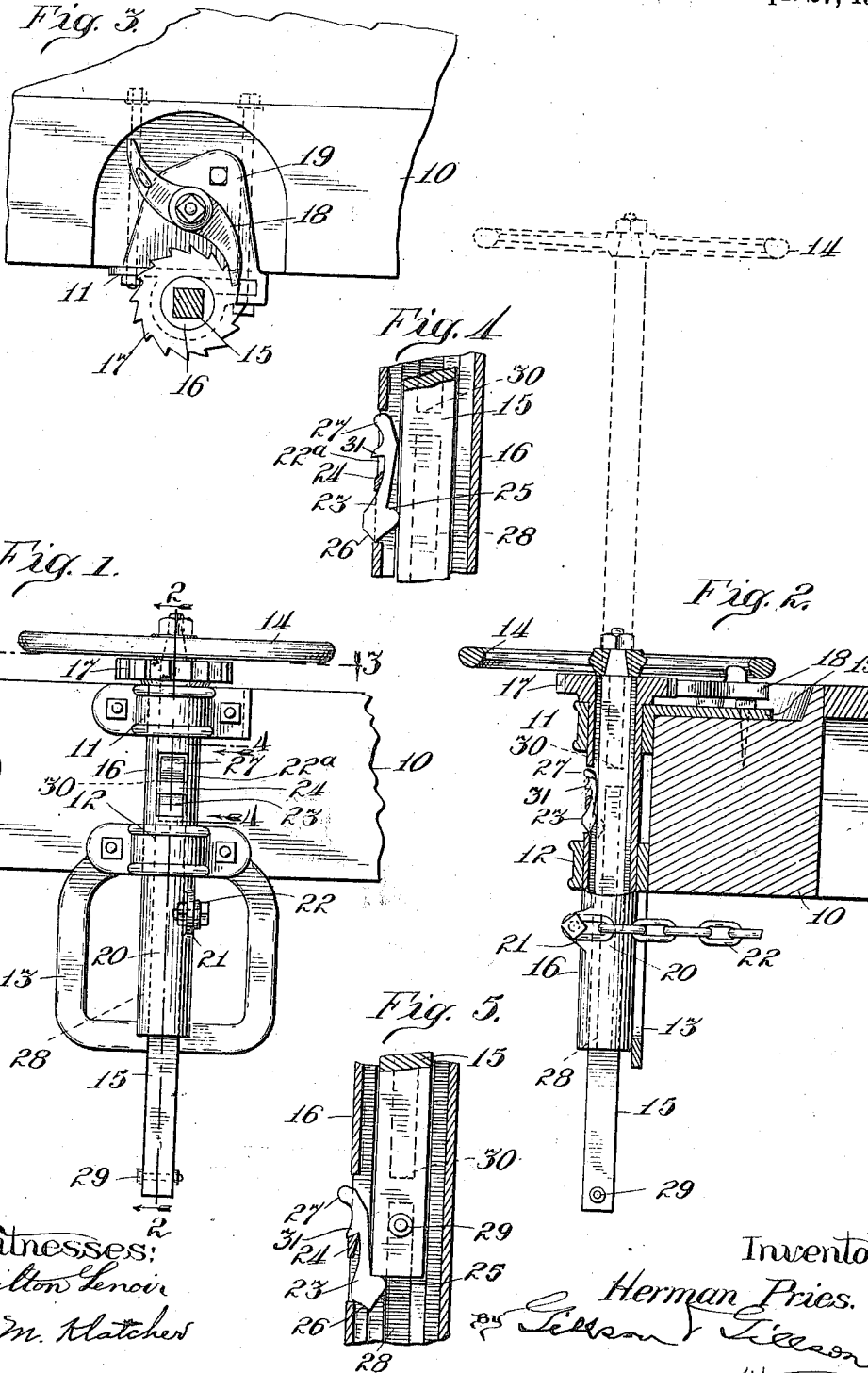
H. PRIES.
BRAKE SHAFT.
APPLICATION FILED FEB. 10, 1913.
1,137,082.
Patented Apr. 27, 1915.
Inventor:
Herman Pries.

HERMAN PRIES, OF MICHIGAN CITY, INDIANA.

BRAKE-SHAFT.

1,137,082.

Specification of Letters Patent.

Patented Apr. 27, 1915.

Application filed February 10, 1913. Serial No. 747,522.

*To all whom it may concern:*

Be it known that I, HERMAN PRIES, a citizen of the United States, and resident of Michigan City, county of Laporte, and State of Indiana, have invented certain new and useful Improvements in Brake-Shafts, of which the following is a specification, and which are illustrated in the accompanying drawings, forming a part thereof.

The invention relates to the shaft of brake mechanism for railway cars, which carries the hand wheel and upon which the chain is wound which communicates power to the brake levers.

The object of the invention is to provide a drop down brake shaft, that is to say, a shaft which may be lowered from service position to bring the hand wheel down to the floor of the car.

The invention is especially adapted for use in connection with flat cars which are frequently loaded with beams or timbers of greater length than the car, and with which the ordinary brake shaft interferes.

The invention consists of a shaft composed of sections telescopically related, one of the sections being journaled in boxes fixed to the car and constituting the shaft drum, the other section carrying the hand wheel and being slidably mounted within the drum; means being provided for locking it in the elevated or service position.

The invention is illustrated in the accompanying drawings, in which—

Figure 1 is a detail end elevation of a car with the improved brake shaft applied thereto, the shaft being shown in its lowered position; Fig. 2 is a sectional view on the line 2—2 of Fig. 1, showing, however, a slightly modified form of construction, the elevated position of the movable section of the shaft being indicated in dotted lines; Fig. 3 is a plan section on the line 3—3 of Fig. 1; Fig. 4 is a detail section on the line 4—4 of Fig. 1; Fig. 5 is a similar view showing the parts in different position.

The end sill of a car is represented at 10, and the shaft boxes secured thereto at 11, 12. The usual brake shaft brace in stirrup form is shown at 13 and as depending from the lower box 12. The usual hand wheel is shown at 14 as being fixed on the upper end of the movable member 15 of the shaft, which is angular in cross-section and is slidingly mounted within the lower section 16 of the shaft. The shaft section 16 is journaled in the boxes 11, 12, and at its lower end bears laterally against the brace 13.

The usual ratchet wheel for holding the brake in set position is shown at 17, and is fixed upon the upper end of the shaft section 16, and coöperates with the holding pawl 18 pivotally mounted upon a plate 19 secured to the floor of the car and which may, as shown in Fig. 2, be set into a recess therein so that the upper faces of the ratchet wheel and pawl are flush with the upper face of the floor. The lower portion 20 of the shaft section 16 constitutes the shaft drum, and is provided with a lug 21 to which the brake chain 22 is secured. Between the boxes 11 and 12 the shaft section 16 is laterally apertured, as shown at 22$^a$, to receive a latch 23 for holding the shaft section 15 in its elevated or service position. Preferably this latch is held within the shaft aperture by means of a bridge 24 crossing the aperture and behind which the shank of the latch is located. The head of the latch is provided with an upwardly facing shoulder 25 for engaging the lower end of the shaft section 15 when the latter is raised, and with a downwardly facing shoulder 26 which bears upon the upwardly facing wall of the aperture 22. A lug or shoulder 31 projects outwardly from the shank of the latch and is so positioned that when the shaft section 15 rests upon the shoulder 25 the lug bears upon the bridge piece 24.

The shank of the latch 23 is provided with a hand piece 27, which projects through the upper portion of the aperture 22$^a$. In order to disengage the latch from the shaft the latter is slightly raised from the position represented in Fig. 5. The hand piece 27 is pressed inwardly, causing the latch to rock upon the shaft so that its lower end is drawn outwardly to the position represented in Fig. 4, thereby permitting the shaft section to be lowered to the position as shown in Figs. 1 and 2.

The shaft section 16 is provided with a longitudinal channel 28 to accommodate the stud 29 set through the shaft section 15 adjacent its lower end, a lug, shown in dotted lines at 30, crossing the channel 28 and being so positioned as to limit the upward movement of the shaft section 15.

The improved brake shaft, while being always in position on the car, may be lowered so that it is out of the way of a load which projects beyond the end of the car and which may, therefore, rest directly upon the hand wheel.

I claim as my invention—

1. In a brake shaft for railway cars, in combination, a sleeve adapted to be journaled in suitable boxes, a rod slidable in the sleeve, a hand piece carried by the rod, means for attaching a brake chain to the sleeve, and a latch pivotally carried by the sleeve for supporting the rod.

2. In a brake shaft for railway cars, in combination, a sleeve adapted to be journaled in suitable boxes, a rod slidable in the sleeve, a hand piece carried by the rod, means for attaching a brake chain to the sleeve, a ratchet wheel carried by the sleeve, a holding pawl coöperating with the ratchet wheel, and a latch pivotally carried by the sleeve for supporting the rod.

3. In a brake shaft for railway cars, in combination, a sleeve adapted to be journaled in suitable boxes and having a lateral aperture and a bridge piece crossing the aperture, a rod slidable in the sleeve, a hand piece carried by the rod, means for attaching a brake chain to the sleeve, and a latch for supporting the rod within the sleeve and being housed within the sleeve aperture and held in place by the bridge piece.

4. In a brake shaft for railway cars, in combination, a sleeve adapted to be journaled in suitable boxes and having a lateral aperture and a bridge piece crossing the aperture, a rod slidable in the sleeve, a hand piece carried by the rod, means for attaching a brake chain to the sleeve, and a latch for supporting the rod within the sleeve and being housed within the sleeve aperture and having a downwardly facing shoulder engageable with the bridge piece.

5. In a brake mast an operated part, an operating part, and means pivotally and slidably mounted within said operated part for supporting said operating part.

6. In a brake mast comprising an operating part, and an operated part operatively connected together, means pivotally and slidably mounted within one of said parts adapted to support the other of said parts, one of said parts being adapted to telescope within the other of said parts when the support is removed.

7. In a brake mast, an operated part and an operating part adapted to be operatively connected to said operated part, said operated part having formed therein an opening for the telescopic reception of said operating part, and means pivotally mounted within said operated part adapted to support said operating part.

8. In a brake mast comprising an operated part and an operating part, one of said parts having formed therein an opening for the telescopic reception of the other of said parts and means pivotally mounted within said operated part adapted to support said operating part.

9. In a brake mast, an operating part, an operated part having an opening formed therein for the telescopic reception of said operating part when said operating part is in inoperative position, and means slidably and pivotally mounted within said operated part for supporting said operating part when in operative position.

HERMAN PRIES.

Witnesses:
Louis M. Boisot,
Jno. W. Carlson.